April 25, 1961 J. MÄDGE 2,981,166
TWIN LENS REFLEX CAMERA WITH PARALLAX COMPENSATION
Filed July 2, 1958 2 Sheets-Sheet 1
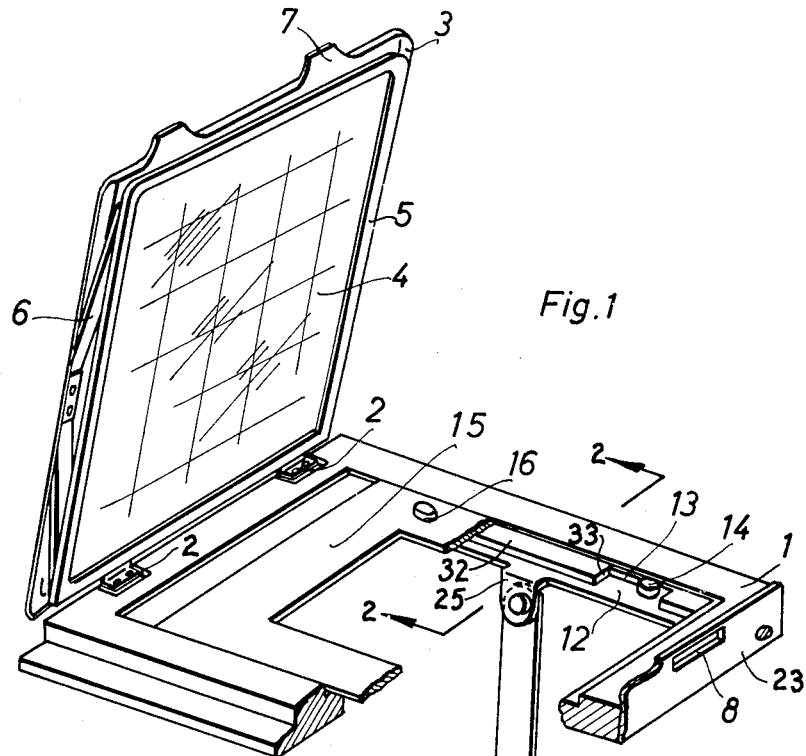
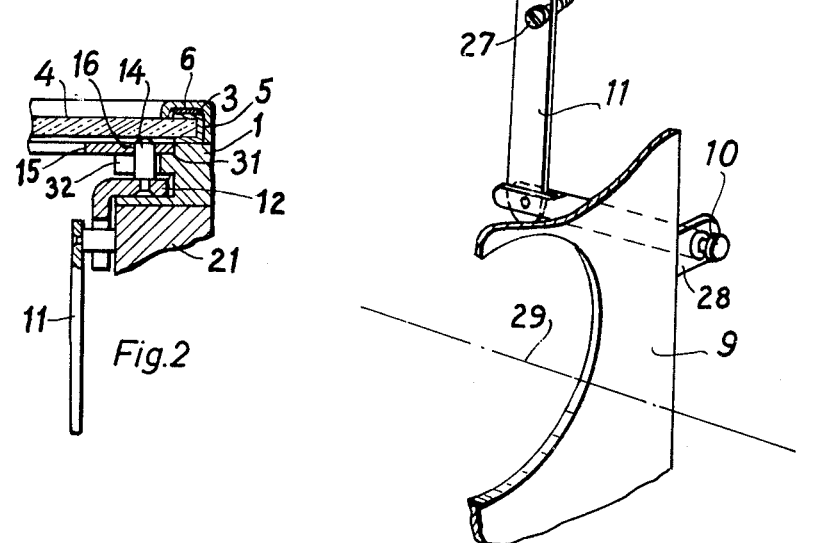

April 25, 1961  J. MÄDGE  2,981,166
TWIN LENS REFLEX CAMERA WITH PARALLAX COMPENSATION
Filed July 2, 1958  2 Sheets-Sheet 2

United States Patent Office 2,981,166
Patented Apr. 25, 1961

2,981,166

TWIN LENS REFLEX CAMERA WITH PARALLAX COMPENSATION

Joachim Mädge, Braunschweig, Germany, assignor to Franke & Heidecke, Fabrik Photographischer Prazisions-Apparate, Braunschweig, Germany, a firm of Germany Filed July 2, 1958, Ser. No. 746,262

Claims priority, application Germany July 11, 1957

6 Claims. (Cl. 95—44)

The present invention relates to mirror reflex cameras of the twin lens type, especially to those intended for multiformat use, and, more particularly, to a parallax compensation arrangement for the focusing chamber of such cameras.

In cameras having a picture-taking chamber and a mirror reflex focusing view-finder chamber arranged above the picture-taking chamber in a common housing (in other words, what is commonly known as a twin-lens reflex camera), the image seen on the focusing screen does not always, because of parallax, agree in position with the image striking the film. It is consequently desirable to have a parallax compensation for the focusing view-finder chamber so that the image appearing on the focusing screen is in the same position relative to the picture area of the focusing screen, as the image produced by the taking lens is relative to the picture area or "frame" on the film.

With a multi-format camera, of course, the amount of image shift necessary to compensate for parallax at any given focusing distance is the same for each of the formats, but is is difficult to provide mechanism for automatically shifting the format mask to compensate for parallax, if the mask is placed in the usual conventional position on top of the ground glass focusing screen.

An object of this invention is to provide a new and improved parallax compensation mechanism for mirror reflex cameras.

Another object of this invention is to provide a new and improved parallax compensation arrangement for multi-format cameras of the type having a picture-taking chamber and a focusing view-finder chamber mounted one above the other in a common housing.

A further object is the provision of a new and improved parallax compensation mechanism for mirror reflex cameras which is useful in providing parallax compensation for a variety of formats.

A still further object is the provision of a new and improved parallax compensation mechanism for multi-format reflex cameras which is simple while yet being correlated with the placement of various format masks.

These and other desirable objects may be attained in the manner disclosed as an illustrative embodiment of the invention in the following description and in the accompanying drawings forming a part hereof, in which:

Fig. 1 is a perspective view of the device according to the present invention, portions thereof being broken away showing the focusing screen in its open position and including the coupling of the slide to the objective support;

Fig. 2 is a cross section of a portion of the device of Fig. 1 taken approximately on the line 2—2 thereof;

The same reference numerals throughout the several views indicate the same parts.

Figure 3:
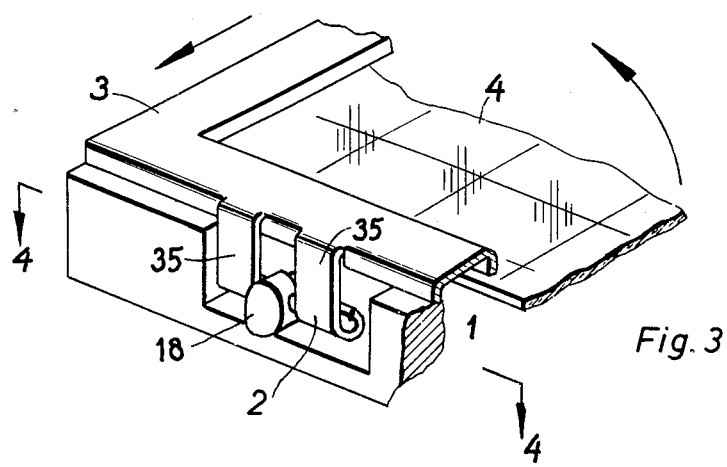
Fig. 3 is a perspective view of a portion of the device of Fig. 1, the focusing screen frame being in its closed position.

While the present invention, at least in its simplest form, is not limited to any particular kind or style or reflex roll film camera having a separate focusing chamber, it is here disclosed by way of example in connection with a twin lens reflex camera identified by the trademark "Rolleiflex," manufactured by the firm of Franke & Heidecke, of Braunschweig, Germany, and widely known and used throughout the United States. The following disclosure of the invention presupposes familiarity with the main constructional features of the "Rolleiflex" camera, and for those not already familiar with the construction of this camera, reference may be made to the book "Rollei Photography, Handbook of the Rolleiflex and Rolleicord Cameras," by Jacob Deschin, published in 1952 by Camera Craft Publishing Company, of San Francisco, California.

In Fig. 1 is shown a rectangular frame 1, it being understood that the frame 1 is secured to the top of the camera casing 21, shown in Fig. 2, immediately above the focusing view finding chamber. To the top of the frame 1 at one edge are secured a pair of spaced hinges 2 for hingedly mounting a focusing screen frame 3. As will subsequently be more clear, the frame 3 is movable between an open position as shown in Fig. 1 and a closed position overlying and approximately parallel to the frame 1. A focusing screen 4, which takes the form of a ground glass screen, is mounted in a sub-frame 5 which is suspended on the frame 3 by means of a pair of spaced springs 6 at either side. The upper surface of the frame 1 serves as a bearing surface and abutment for the ground glass screen 4, so that when the frame 3 is swung downwardly, the ground glass screen 4 is accurately placed in the focusing plane, the springs 6 serving to hold the ground glass screen tightly in place. The free edge of the frame 3 (opposite to the edge having the hinge 2) carries a pair of spaced projections 7. These projections are engageable with a pair of spaced openings 8 carried by a plate 23 fastened to the corresponding edge of the frame 1 (i.e., the edge thereof opposite to the hinges 2). Thus the focusing screen frame 3 and the ground glass 4 are held in place in the operative or closed position of the frame 3 by the latch comprising the projections 7 and openings 8. To enable the latch 7, 8 to be released to raise the focusing screen when required, the hinges 2 are made resilient in a direction toward and away from the latch plate 23, as will be further explained below. Of course, any other suitable type of latch may be provided.

As best seen in Fig. 2, the frame 1 at one side has a pair of inwardly directed spaced flanges providing a guideway 13. Disposed within the guideway 13 is a slide 12, in the form of a hollow rectangular frame which constitutes the masking frame for the maximum format size of the camera. For parallax correction, this frame 12 is arranged to assume a longitudinal position in dependence on the position of the objective of the camera. To this end, the slide 12 has a downwardly bent ear 25 to which is pivoted a link 11. A fulcrum for the link 11 is provided by a fixed screw 27 or the like extending approximately centrally through the link into the camera housing.

Secured to the objective support 9 is a laterally extending ear 28 to which is fixed a pusher rod 10. The other end of the pusher rod 10 is bifurcated and receives the other end of the link 11 and is pivoted thereto. By this arrangement, it can be seen that movement of the objective support 9 in the direction of the optical axis, which is indicated at 29, causes longitudinal movement of the slide 12 within the guideway 13. As well understood by those familiar with "Rolleiflex" cameras, the objective support 9 carries both the picture taking lens and the finder lens, and moves backwardly and forwardly, in the direction of the optical axis 29, under the influence of the usual focusing knob located on the left hand side wall of the camera body. The parts are so proportioned and arranged and the fulcrum 27 is so located that a given movement of the objective support 9 produces the required movement of the slide 12 according to the amount of parallax compensation required. Two of the levers 11 and links 10 may be used, one at each side of the camera, although a single set of parts at one side of the camera is frequently sufficient.

The maximum size format of the camera is determined by the size of the open space within the sliding frame 12, which is almost equal to the size of the ground glass screen 4. That is, when the focusing frame 3 and the ground glass screen 4 are in their closed or operative position, the image from the focusing view finder chamber objective passes upwardly through the opening in the frame 1 onto the screen 4 and substantially fills the screen 4. Indeed, the focusing screen 4 need be no wider than the side-to-side space within the slide or mask 12, but it should be a little longer, in order to be able to receive the full size of the focusing image in all positions of adjustment of the slide 12.

To enable the use of the camera for taking pictures of smaller sized format, a plurality of interchangeable masks 15 are provided, one for each format. Each mask 15 fits, one at a time, along the top frame 1 within a pair of rabbets 31 provided on lateral flanges 32 overlying the sliding mask frame 12 at each side of the opening in the frame 1. The masks 15 and the slide 12 are coupled in a suitable manner for conjoint movement so that the position of the mask 15 is shifted like that of the slide 12, when changing the position of the objective support 9 for focusing purposes. For this purpose, the slide 12 has a pair of spaced upwardly extending pins 14 secured to it. The upper flange 32 on the top frame 1, defining the guideway 13 and supporting the interchangeable mask 15, is cut away to provide a pair of cut-outs or notches 33 through which the pins 14 extend, the ends of each of the cut-outs providing a stop limiting the forward and backward movements of the pins 14. The mask 15 has an aperture 16 for each of the pins 14, each aperture receiving its respective pin 14 to couple the mask 15 and the slide 12 for conjoint movement. In this manner, it can be seen that movement of the objective support 9 along the optical axis 29 causes dependent movement of the slide 12 and the mask 15.

Figure 4:
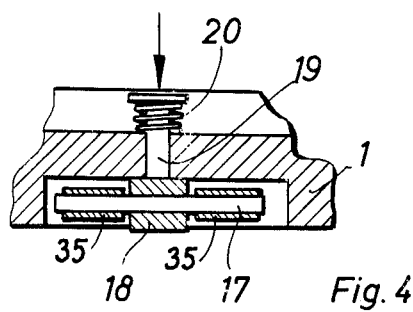
Fig. 4 is a cross section of a portion of the device of Fig. 3 taken approximately on the line 4—4 thereof.

The structure of the resilient hinges 2 is shown in greater detail in Figs. 3 and 4. As has been explained, the focusing frame 3 has projections 7 which fit within the openings 8 to provide a latch releasably holding the frame 3 and the ground glass screen 4 in its closed or operative position. In order to fasten and release the latch 7, 8, the hinges 2 are resiliently mounted for movement toward and away from the latch plate 23 in the plane of the frame 3. As here shown, a hinge pin 17 is mounted in a head 18 carried by a pin 19 which extends through an aperture in the end rail of the frame 1 and is resiliently urged toward the end wall by a spring 20 acting between the pin 19 and frame 1. A pair of spaced hinge leaves 35 extend approximately at right angles to the plane of the focusing frame 3 and wrap around each extending end of the hinge pin 17. With this arrangement, it can be seen that movement of the focusing frame 3 rearwardly in the direction away from the plate 23 moves the pin 17 and head 18 away from the end rail of the frame 1 to allow the projections 7 to drop behind the plate 23 and into alinement with the openings 8. On release of the pressure, of course, the spring 20 acts to return the head 18 to a position against the end wall of the frame 1 thus moving the projections 7 through the openings 8 to complete the latching action.

In operation, the appropriate mask 15 is first selected according to the format desired. If the maximum format is to be used, no mask 15 is required. Assuming that one of the smaller formats is to be set up, the focusing frame 3 and ground glass screen 4 are moved to their open position as shown in Fig. 1 by pressing inwardly on the projections 7 until they clear the openings 8. As has been explained, the springs 20 on each of the hinges 2 allow lateral movement of the frame 3 relative to the frame 1. The mask 15 is then dropped within the rabbets 31 on the top frame 1 with the pins 14 projecting through the apertures 16. The frame 3 and ground glass screen 4 are next moved to their closed position, the projections 7 extending through the openings 8. It is to be noted that the springs 6 mounted on the focusing screen 4 on the frame 3 act to hold the focusing screen tightly against the upper surface of the top of the frame 1 to assure that the focusing screen 4 is accurately in the focusing plane.

Movement of the objective and objective support 9 along the optical axis 29 moves in like manner, the pusher rod which, being pivoted to the link 11 acting about the fulcrum 27, changes the position of the slide 12 within the guideways 13 by a corresponding or proportional amount. Inasmuch as the mask 15 is directly coupled to the slide 12 by means of the pins 14, the position of the mask 15 is changed a corresponding amount. Thus, according to the position of the objective support 9, the mask 15 is moved so as to provide the correct amount of parallax compensation. The amount of compensation for each position of the objective support 9 is determined by the size and arrangement of the linkage between the objective support 9 and the slide 12 and also by the position of a fulcrum 27. When a different format is desired, the mask 15 is simply changed. No change in the arrangement of the slide 12 and linkage 11, 10 is required for the different formats, the correct amount of parallax compensation being provided for each of the formats. When a format mask 15 is used in connection with the focusing screen, of course a corresponding format mask or adapter is also inserted in front of the film, in the focal plane of the camera, but the use of such a mask at the focal plane is well known in itself and the details thereof are not important for purposes of the present invention.

The parallax compensation mechanism herein described is relatively simple while yet giving good results for a variety of formats. It is extremely easy to insert or remove various format masks as may be required from time to time, yet when a mask has been inserted, both the mask and the focusing screen are adequately held against accidental displacement or loss.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A reflex camera comprising a housing having a focusing chamber and an objective support movable relative to said chamber in the direction of an optical axis for purposes of focusing, a rectangular frame secured to the top of said housing above said focusing chamber, a focusing frame hinged to said rectangular frame and movable between an open position and a closed position overlying said rectangular frame, a focusing screen, spring means mounting said screen on said focusing frame whereby said screen is held tightly in the focusing plane when said focusing frame is moved to said closed position, a hollow rectangular slide, means on said rectangular frame for slidably receiving said slide, means for connecting said objective support and slide whereby movement of said objective support along the optical axis positions said slide in dependence on the amount of parallax compensation to be applied, recess means on the top of said rectangular frame adapted to slidably receive a format mask, and coupling means adapted to couple said slide and mask for conjoint movement.

2. A reflex camera comprising a housing having a focusing chamber and an objective support movable relative to said chamber in the direction of an optical axis for purposes of focusing, a rectangular frame secured to the top of said housing above said focusing chamber, a focusing frame hinged to said rectangular frame and movable between an open position and a closed position overlying said rectangular frame, a focusing screen, spring means mounting said screen on said focusing frame whereby said screen is held tightly in the focusing plane when said focusing frame is moved to said closed position, a hollow rectangular maximum format masking slide, spaced flanges on said rectangular frame defining opposing guideways for slidably receiving said slide, linkage means for operatively connecting said objective support and slide whereby movement of said objective support along the optical axis positions said slide in dependence on the amount of parallax compensation to be applied, a recess in the top of said rectangular frame adapted to slidably receive a format mask, and coupling means carried by said slide and adapted to couple said slide and mask for conjoint movement.

3. A reflex camera comprising a camera having a focusing chamber and an objective support movable relative to said chamber in the direction of an optical axis for purposes of focusing, a rectangular frame secured to the top of said housing above said focusing chamber, a focusing screen hinged to said frame and movable between an open position and a closed position overlying said frame, a hollow rectangular slide, spaced flanges on said frame defining opposing guideways for slidably receiving said slide, means for connecting said objective support and slide whereby movement of said support positions said slide in dependence on the amount of parallax compensation to be applied, a format mask, a recess in the top of said frame slidably receiving said format mask, at least one notch in the upper of said spaced flanges, and a pin secured to said slide and extending through said notch into an aperture in said mask for coupling said slide and mask for conjoint movement.

4. A reflex camera comprising a housing having a focusing chamber and an objective support movable relative to said chamber in the direction of an optical axis for purposes of focusing, a rectangular frame secured to the top of said housing above said focusing chamber, a focusing frame hinged to said rectangular frame and movable between an open position and a closed position overlying said rectangular frame, a focusing screen, spring means mounting said screen on said focusing frame whereby said screen is held tightly in the focusing plane when said focusing frame is moved to said closed position, a hollow rectangular slide, means on said rectangular frame for slidably receiving said slide, means for operatively connecting said objective support and slide whereby movement of said support positions said slide in dependence on the amount of parallax compensation to be applied, a removable format mask, means on said rectangular frame spaced above said means for receiving said slide for slidably receiving said format mask, and coupling means carried by said mask and slide for coupling said mask and slide for conjoint movement.

5. A construction as defined in claim 4 wherein the hinges for hinging said focusing frame to said rectangular frame are resiliently movable in a direction in the plane of said focusing frame, and latch means carried by the opposite edges of said frame for latching said frames in said closed position.

6. A twin lens reflex camera comprising a fixed frame for supporting a focusing screen, said frame including a lower guideway and an upper guideway parallel to each other, a focusing screen pivotally mounted on said frame to lie flat thereon in overlying relation to said upper guideway when in effective focusing position and adapted to swing upwardly away from said guideway to an ineffective position, a maximum format masking slide mounted in said lower guideway for movement therein in a plane parallel to said focusing screen when the latter is in its said effective focusing position, means for shifting said slide in said lower guideway to compensate for parallax, a pin fixed to said slide and projecting upwardly therefrom into the plane of said upper guideway, and an interchangeable format mask in said upper guideway and retained therein by said focusing screen when said screen is in its said effective position, said format mask being removable from said upper guideway by lifting it upwardly out of said upper guideway when said screen is in its said ineffective position, said format mask engaging said pin on said masking slide so that parallax compensating movements of said masking slide will be transmitted to said format mask.

References Cited in the file of this patent
UNITED STATES PATENTS

| | | |
|---|---|---|
| 780,649 | French | Jan. 24, 1905 |
| 2,048,773 | Baumgartner | July 28, 1936 |
| 2,211,995 | Walker | Aug. 20, 1940 |
| 2,833,191 | Weiss | May 6, 1958 |